(12) United States Patent
Garcia-Luna-Aceves et al.

(10) Patent No.: US 7,035,227 B2
(45) Date of Patent: Apr. 25, 2006

(54) ON-DEMAND LOOP-FREE MULTIPATH ROUTING (ROAM)

(75) Inventors: Jose J. Garcia-Luna-Aceves, San Mateo, CA (US); Jyoti Raju, Saratoga, CA (US)

(73) Assignee: The Regents of the University of California, Oakland, CA (US)

( * ) Notice: Subject to any disclaimer, the term of this patent is extended or adjusted under 35 U.S.C. 154(b) by 929 days.

(21) Appl. No.: 09/975,089

(22) Filed: Oct. 9, 2001

(65) Prior Publication Data

US 2002/0101869 A1 Aug. 1, 2002

Related U.S. Application Data

(60) Provisional application No. 60/239,428, filed on Oct. 10, 2000.

(51) Int. Cl.
*H04L 12/28* (2006.01)
(52) U.S. Cl. .................................. 370/254; 370/351
(58) Field of Classification Search ................ 370/351, 370/254, 255, 256; 709/238, 222
See application file for complete search history.

(56) References Cited

U.S. PATENT DOCUMENTS

| | | | | |
|---|---|---|---|---|
| 4,825,206 A | * | 4/1989 | Brice et al. ............ 340/825.02 |
| 5,027,350 A | * | 6/1991 | Marshall .................... 370/401 |
| 5,488,608 A | * | 1/1996 | Flammer, III ............... 370/400 |
| 5,530,963 A | * | 6/1996 | Moore et al. ............... 709/243 |
| 5,608,721 A | * | 3/1997 | Natarajan et al. ........... 370/238 |
| 5,881,243 A | * | 3/1999 | Zaumen et al. ............. 709/241 |
| 6,118,760 A | * | 9/2000 | Zaumen et al. ............. 370/229 |
| 6,535,498 B1 | * | 3/2003 | Larsson et al. ............. 370/338 |

OTHER PUBLICATIONS

Gafni Eli M. et al.; "Distributed Algorithms for Generating Loop-Free Routes in Networks With Frequently Changing Topology," IEEE Transactions on Communications, vol. COM-29, No. 1, pp. 11-18, Jan., 1981.
Garcia-Luna-Aceves, J.J.; "Loop-Free Routing Using Diffusing Computations," IEEE/ACM Transactions on Networking, vol. 1, No. 1, pp. 130-141, Feb., 1993.
Huitema, C.; "Routing in the Internet," Chapter 6, pp. 145-148, Prentice Hall PTR, (1995).

(Continued)

*Primary Examiner*—Wellington Chin
*Assistant Examiner*—F. Lin Khoo
(74) *Attorney, Agent, or Firm*—John P. O'Banion

(57) ABSTRACT

A method is described for distance vector routing of on-demand traffic between routers within an ad-hoc network maintaining multiple loop-free paths to destinations. Each router maintains routing table entries only for destinations associated with data flows through the router which reduce the amount of storage space and bandwidth required for routing table maintenance. Diffusing computations are utilized for establishing and maintaining the routes within the network. The sending of unnecessary flood searches and search-to-infinity problems are avoided, while the protocol decreases the vulnerability of the network to various service attacks along with router failures, fading, and drop outs.

39 Claims, 8 Drawing Sheets

OTHER PUBLICATIONS

Jaffe, Jeffrey M. and Moss, Franklin H.; "A Responsive Distributed Routing Algorithm for Computer Networks," IEEE Transactions on Communications, vol. COM-30, No. 7, pp. 1758-1762, Jul., 1982.

Johnson, D.B. and Maltz, D.A.; "Dynamic Source Routing in Ad-Hoc Wireless Networks," Mobile Computing, eds. Imielinski, Tomasz and Korth, Hank, Kluwer Academic Publishers, (1996).

Ju, J. and Li, V.O.K.; "An Optimal Topology-Transparent Method In Multihop Packet Radio Networks," IEEE/ACM Transactions Networking, vol. 6, No. 3, pp. 298-306, Jun., 1998.

Moy, J.; "OSPF Version Two," Network Working Group, Proteon, Inc., Request for Comments: 1247, pp. 1 thru 136, Jul., 1991.

Park, V.D. and Corson, M.S.; "A Highly Adaptive Distributed Routing Algorithm for Mibile Wireless Networks," Proceedings IEEE Infocom'97, Kobe, Japan, pp. 1 thru 9, Apr., 1997.

Perkins, C.E. et al.; "Ad Hoc On-Demand Distance Vector (AODV) Routing," Internet Draft, Mobile Ad Hoc Networking Group, Nokia Research Center, University of California-Santa Barbara, University of Cincinnati, pp. 1 thru 29, Nov. 9, 2001.

Shepard, T.; "A Channel Access Scheme for Large Dense Packet Radio Networks," Proceedings ACM SIGCOMM '96 , pp. 1-12, Aug., 1996.

Zhu, C. and Corson, S.; "A Five-Phase Reservation Protocol (FPRP) for Mobile Ad-Hoc Networks," Proceedings IEEE Infocom '98, pp. 1-10, (1998).

* cited by examiner

ON-DEMAND LOOP-FREE MULTIPATH ROUTING (ROAM)

CROSS-REFERENCE TO RELATED APPLICATIONS

This application claims priority from U.S. provisional application Ser. No. 60/239,428 filed on Oct. 10, 2000, incorporated herein by reference.

STATEMENT REGARDING FEDERALLY SPONSORED RESEARCH OR DEVELOPMENT

This invention was made with Government support under Grant No. F30602-97-2-0338, awarded by the Air Force Office of Scientific Research (AFOSR). The Government has certain rights in this invention.

REFERENCE TO A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright has no objection to the facsimile reproduction by anyone of the patent document or the patent disclosure, as it appears in the United States Patent and Trademark Office file or records, but otherwise reserves all copyrights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention is generally directed at network routing protocols and more particularly is directed to a source-directed on-demand network protocol that limits bandwidth consumption.

2. Description of the Background Art

On-demand routing protocols are being increasingly utilized with mobile ad-hoc networks and wired networks when a conventional base-station infrastructure is not available. On-demand routing algorithms were originally proposed for mobile ad-hoc networks, which are autonomous systems of mobile hosts connected by wireless links. These networks are useful in tactical and commercial scenarios in which there is no base-station infrastructure present. Ad-hoc radio networks, containing mobile nodes suffer from a limited amount of bandwidth, and one method of reducing the amount of bandwidth consumed is to maintain routes to only those destinations for which a router has data traffic. This reduces the number of updates that are sent in response to the constant topology changes.

However, as the use of the Internet increases, it is foreseeable that many enterprises will become solely dependent on the business activities conducted over the Internet. For example, financial services, securities exchanges, and emergency services all require reliable Internet connectivity. In such situations, it is not unusual for organizations to provide topological redundancy in the form of multiple links with separate gateway routers to the Internet. One issue with using multiple egress links is that manual configuration of internal routers would be needed to direct the default route to one of the gateway routers, which requires considerable planning and monitoring. Running an on-demand routing protocol in the routers of the network would allow routers to dynamically select different gateway routers for different destinations in the Internet. This would provide implicit load balancing, because some gateway routers can offer better paths to certain destinations. Also, the routers would transition more smoothly to any available gateway router if link to the Internet which is currently in use, were to fail. The main advantage of on-demand routing over the table-driven routing approach is that internal routers need only maintain routes for the subset of routes they are using. The flood search used by on-demand routing need only be propagated up to the edge of the organization network. This mechanism can be used to maintain routes to both internal destinations and external destinations.

All prior work in on-demand routing has focused on wireless networks and has followed three main approaches to ensuring that the routes obtained are free of long-term loops. The dynamic source routing (DSR) protocol is an example of a protocol which uses complete-path information to avoid loops. In DSR, the network is flooded with queries when a source requests a search for a route to a destination. Finding a route results in a reply being sent back in a route reply packet and the resultant routes are stored in a route cache at the sender. The sources are in charge of re-establishing routes when topology changes break existing routes to destinations.

The ad-hoc on-demand distance vector routing algorithm (AODV) is an example of using sequence numbers to avoid long-term loops. In AODV each destination maintains a sequence number that it updates every time there is a connectivity change with its neighbors. A router accepts those routes for a destination that are associated with the largest sequence number received for that destination. Routers whose routes to the given destination become broken increase the sequence number for the destination and report an infinite distance to all the neighbors using them as a next hop to the destination.

The Temporally-ordered routing algorithm (TORA) is an example of using time stamps and internodal coordination to avoid looping. TORA uses a link-reversal algorithm to maintain loop-free multipaths that are created by a query-reply process similar to the above two algorithms. TORA relies on clocks to create timestamps that maintain the relative ordering of events.

Under current on-demand routing protocols, when a destination fails or becomes unreachable from a network component, a source trying to obtain a path to the destination finds that its flood-search for the destination fails. However, the source is unable to determine whether or not it should start another flood search, which may have failed, for example, simply due to a temporary link failure induced by fading or node mobility. There are no inherent mechanisms within the current on-demand routing protocols to prevent a source from repeating its search in the event that the destination is not reachable, which we call the "search-to-infinity problem".

It can be observed with some of today's on-demand routing protocols, that when a destination fails or becomes unreachable from a network component, a source trying to obtain a path to the destination finds that its flood-search for the given destination fails, but it is unable to determine whether or not it should start another flood search. It will be appreciated that the flood search may have failed simply due to temporary link failures induced by fading or node mobility. There are no inherent mechanisms in these on-demand routing protocols that would prevent a source from continually repeating its search in the event that the destination is not reachable, which is referred to as searching-to-infinity. This search-to-infinity problem also causes the network, either wired or wireless, to run an on-demand routing protocol that is susceptible to a unique form of attack, wherein a malicious router can indefinitely query a network for a destination that does not exist, thus causing network congestion due to queries. Consequently, external mechanisms are used today in order to stop sources from sending unnecessary queries. In DSR and AODV, routers do not keep state about the search queries in progress, and the application accessing the on-demand routing service must implement a hold-down time after a search fails; however, just as it was the case in Cisco's® IGRP, it is difficult to determine an adequate length of hold-down time or the number of times a source should persist requesting a path to a destination. In addition, it will be appreciated that each source must go through the process independently. On the other hand, in TORA, routers that have processed a search query keep the state and the source need not repeat the search query multiple times.

Therefore, a need exists for an on-demand routing protocol that provides for bandwidth efficient routing without unnecessary search flooding which also affords protection from service attacks, and outages, as outlined above. The present invention satisfies those needs, as well as others, and overcomes the deficiencies of previously developed routing protocols.

BRIEF SUMMARY OF THE INVENTION

The present invention, which is referred to herein as ROAM (routing on-demand acyclic multipath), is an on-demand routing protocol for wired and wireless networks. This on-demand protocol limits the amount of bandwidth consumed by maintaining routes to only those destinations for which a source has data traffic. Therefore, the routing is source-initiated as opposed to being a table-driven routing protocol that is destination initiated.

ROAM uses internodal coordination along directed acyclic subgraphs defined solely by routers distances to destinations. ROAM does not use complete-path information in data packets and does not use sequence numbers, or time stamps, thus making it less susceptible to inefficient behavior in the presence of node failures or loss of synchronization. In ROAM, routes are established and maintained on demand using diffusing computations. A router does not need to send updates for active destinations, unless its distance to them increases beyond a given threshold, thus control overhead is reduced.

ROAM provides loop-free paths using only distances to destinations. The invention also provides a solution to what may be termed the "search-to-infinity problem" within existing on-demand routing protocols. In ROAM, a search query in a connected component results in either the source requesting a route to the destination obtaining its answer or all the routers determining that the destination is unreachable. Hence, ROAM eliminates the need for application-level mechanisms to prevent excessive flooding or searching in the event that destinations are not reachable.

An object of the invention is to provide an on-demand routing protocol that utilizes bandwidth efficiently and is less susceptible to attacks from malicious routers.

Another object of the invention is to provide a source-initiated routing protocol that does not rely on destination-initiated table-driven routing.

Another object of the invention is to eliminate unnecessary search flooding and search-to-infinity problems.

Another object of the invention is to provide an on-demand routing protocol in which control overhead is reduced.

Another object of the invention is to provide an on-demand routing protocol that maintains efficient operation even in cases of node failures.

Another object of the invention is to provide an on-demand routing protocol that does not require the use of complete-path information, sequence numbering, or time stamping for routing control.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
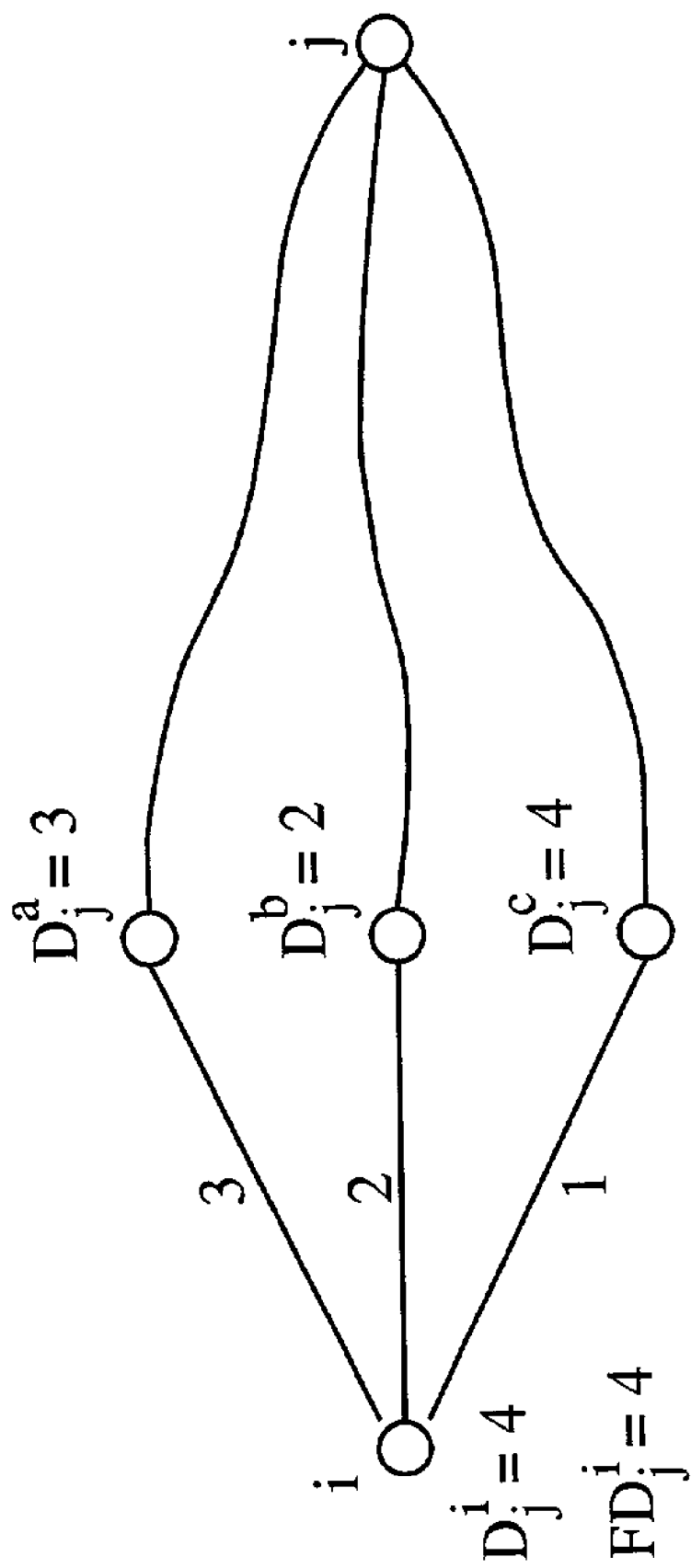
FIG. 1 is a topological map of nodes between which traffic is being routed using the ROAM protocol according to an embodiment of the present invention, showing a router j as a destination for routers a, b, and c which are neighbors of router i.
Figure 2A:
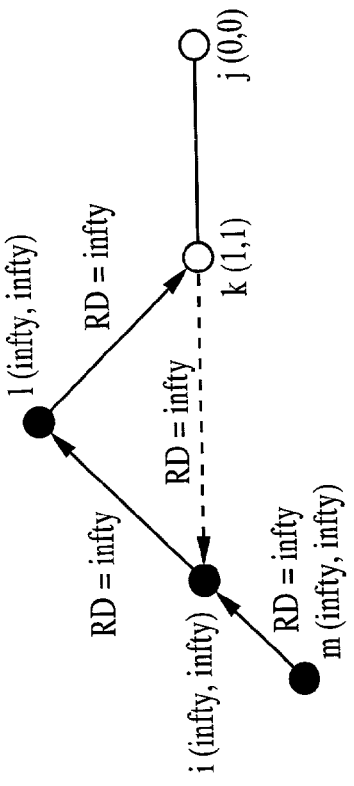
FIGS. 2A–2F is a topological map of traffic being routed according to an embodiment of the present invention, showing the operation of the routing protocol between nodes i, j, k, l, and m.
Figure 2C:
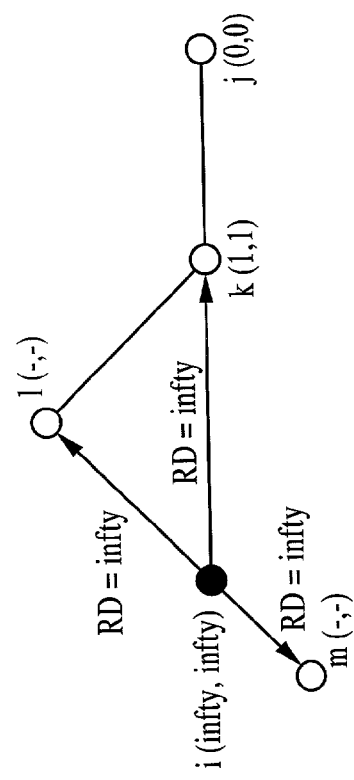
Figure 2B:
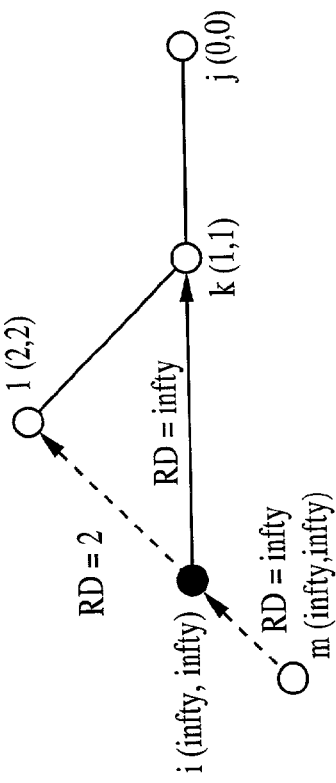
Figure 2D:
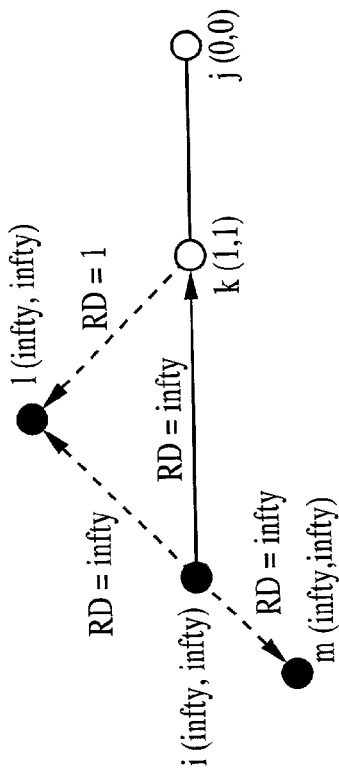
Figure 2E:
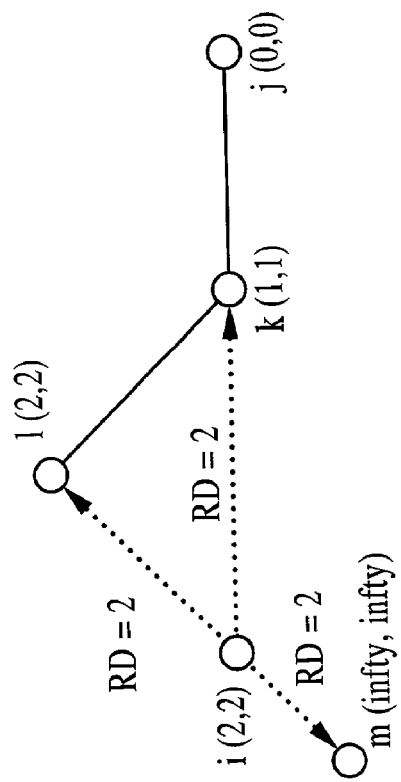
Figure 2F:
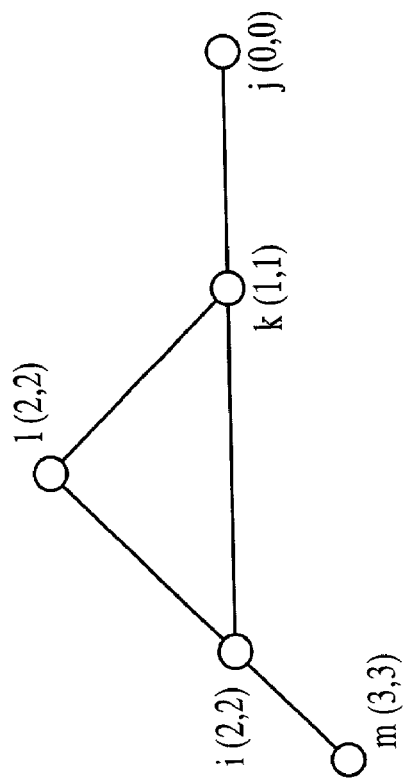

Referring more specifically to the drawings, for illustrative purposes the present invention is embodied in the apparatus and methods generally shown in FIG. 1 through FIG. 7. It will be appreciated that the apparatus may vary as to configuration and as to details of the parts, and that the method may vary as to the specific steps and sequence, without departing from the basic concepts as disclosed herein.

I. Introduction

The present invention is a new approach to the establishment and maintenance of loop-free routes on demand in either wireless networks or wired networks. The ROAM (routing on-demand acyclic multipath) algorithm of the present invention uses internodal coordination along directed acyclic subgraphs-defined solely on the routers' distances to destinations. The operations used to coordinate nodes are referred to herein as "diffusing computations". ROAM extends the diffusing update algorithm (DUAL) to provide routing on demand and provides loop-free paths using only distances to destinations. The ROAM protocol also provides the first treatment of what may be referred to as the "search-to-infinity problem" which can occur when utilizing current on-demand routing protocols. In ROAM, a search query in a connected component results in either the source requesting a route to a destination obtaining its answer or all the routers determine that the destination node is unreachable. Hence, ROAM eliminates the need for application-level mechanisms to prevent excessive flooding of searches in the event destinations are not reachable.

II. Network Model and Notation

To describe ROAM, we model a network as an undirected graph G(V,E), wherein V is the set of routers in the network and E is the set of links in the network. A link is said to exist between two routers if they can exchange packets. Each link has two costs associated with it—one in either direction.

Our description and verification of ROAM assumes the existence of a link level protocol ensuring that:

(a) ROAM is notified about the existence of a new neighbor or the loss of connectivity with a neighbor within a finite time.

(b) Link costs are always positive and a failed link has an infinite cost.

(c) All control packets are sent reliably and are received within a finite amount of time. If the packets cannot be sent after a specified amount of retries, then the link layer marks the neighbor as being down and sends an indication to the routing protocol. Since control packets travel only one-hop, we only require single hop reliability.

(d) All messages and changes in the cost of links and the addition and deletion of neighbors are processed within a finite time.

(e) Messages can be transmitted over a link only when it is perceived as being up.

Reliable message transmission can be easily added into a routing protocol for a wired network. In a wireless network, the logical link control necessary to satisfy the above assumptions can be implemented on top of any MAC protocol designed for wireless links based on collision avoidance (e.g., IEEE802.11), TDMA, or any of the various dynamic scheduling MAC protocols proposed recently without requiring additional network-level control packets.

Each roster has a unique ID and all the link costs are positive though they may vary in value. The following notations are utilized herein:

N: the set of destinations a router knows about.

$N_i$: the set of routers connected through a link with router i, i.e., the set of neighbors of router i i: a neighbor of router i.

(i,k): the link between routers i and k in V.

$l_k^i$: the cost of the link to neighbor k; the cost of a failed link is assumed to be $\infty$.

$D_j^i(t)$: the current distance maintained by router i for destination j at time t.

$D_j^i(t)$: the distance from router k to router j as known by router i at time t.

$FD_j^i(t)$: the feasible distance at router i for destination I this distance is used to check if the feasibility condition (defined in Section III-B) is satisfied.

$RD_j^i(t)$: the cost for destination j used in messages sent to the neighbors at time t.

$D_j^{*i}(t)$: the smallest value assigned to from the time i became passive up to time t.

$SS_j^i$: is the set of neighbors of router i that offer loop-free routes to destination j; any neighbor k whose distance as known by i, $D_{jk}^i$ is lesser than the feasible distance $FD_j^i$ belongs to this set.

$s_j^i$: the successor for destination j; this successor offers a loop-free path to destination j and is used for data packets.

$o_j^i$: the query origin flag records how a router, gets into the active state (further explanation in section III-D $T_j^i$: this timestamp is maintained for each destination. It indicates the last time a data packet was seen for the destination.

$ST_{jk}^i(t)$: this value can be set to active or passive; when set to active, it indicates that router i expects neighbor k to return a reply for destination j.

III. ROAM

A. Information stored and exchanged by each router

Each router maintains a distance table, a routing table and a link-cost table. The distance table at router i is a matrix containing, for each destination j and for each neighbor k of router i, the distance $D_{jk}^i$ as last reported by k and a reply status flag $ST_{jk}^i$, which is set to active if router i has sent a query to router k for destination j but has not received a reply and set to passive otherwise.

The routing table at router i is a column vector containing, for each destination j, the distance to the destination $D_j^i$, the feasible distance to the destination $FD_j^i$, the reported distance to the destination $RD_j^i$, the successor $s_j^i$, the query origin flag $o_j^i$ and a timestamp $T_j^i$ indicating the last time a data packet was seen to destination j. Therefore, if there is no data traffic seen to a destination, the destination entry is eventually timed out and removed from the routing table.

The link-cost table lists the costs of links to each known adjacent neighbor. The cost of a link from i to k is denoted as $l_k^i$ and is considered to be infinity when a link fails.

There are three types of control packets used by the routing protocol: queries, replies, and updates. A control packet from router i to router k contains the addresses i and k and the address of the destination j for which a path is desired. The packet also contains a field indicating the reported distance ($RD_j^i$) from router i to destination j. A flag $u_j^i$ indicates whether a control packet is an update, a query or a reply to a query. The distance in a packet can be set to any positive value including infinity. In addition, update packets can have a negative value which indicates that they are delete updates, such as updates directed to erase routing-table entries that are not needed at the given routers.

B. Active and Passive States in ROAM

A router i updates its routing table for a destination j when: (a) it needs to add an entry for j, (b) it needs to modify its distance to j which includes setting that distance to $\infty$, and (c) it decides to erase the entry for j.

For a given destination, a router that has sent queries to all its neighbors and is waiting for replies from at least one of its neighbors is said to be active; otherwise, it is said to be passive. With respect to a given destination j, a router running ROAM can be in one of the following three states: (a) passive state wherein its knowledge of the existence of node j is uncertain, (b) active state in which it is waiting to obtain distance information about j while creating routes, and (c) active state in which it is waiting for replies from neighbors about a known destination j while maintaining routes. A router i initializes itself in the passive state with a distance of zero to itself ($D_j^i = FD_j^i = RD_j^i = 0$, $s_j^i = i$, $T_i^i$=present time).

A router becomes active or passive for a given destination depending on whether or not at least one of its neighbors has reported a distance to the destination that is short enough to be trusted not to lead to a loop. To maintain loop-free routes, each router can only select as successor a neighbor that satisfies either of the two feasibility conditions. To help define the feasibility condition, we define another term which we call the feasible successor $fs_j^i$. The feasible successor provides the shortest loop-free path to the destination. The passive feasibility condition (PFC) is to be satisfied by a router's successor when a router is passive. From the specification of PFC below, it will be appreciated that only a feasible successor will satisfy PFC. The active feasibility condition (AFC) comes into play only when a router is active, such as when there is no longer any feasible successor. However, one can appreciate that any neighbor in $SS_j^i$ will satisfy AFC. When a router is active, neighbors in $SS_j^i$ no longer provide the shortest path, and they merely provide a loop-free path.

PFC: If at time t router i needs to change its successor, it can choose as its new successor any neighbor $q \in N_i(t)$ for which $D_{jq}^i(t) + l_q^i(t) = \mathrm{Min}\{D_{jx}^i(t) + l_x^i(t) \forall x \in N_i(t)\}$ and $D_{jq}^i(t) < FD_j^i(t)$, where $FD_j^i(t) = D_j^{*i}(t)$.

AFC: If at time t router i becomes active, then it can set its successor to any neighbor $q \in N_i(t)$ where $D_{jq}^i(t) < FD_j^i(t)$. If there is no such router, then the router maintains its earlier successor until it becomes passive again.

The feasible successor plays a key role in maintaining loop-freedom, because it creates a total ordering of distances along any path. Only the distance through the feasible successor is reported in control messages. Therefore, we are able to maintain multiple routes while introducing no extra latency or control messages. Neighbor routers that satisfy AFC and not PFC can be used for forwarding packets even while the router is active or passive, but their distances are not used in path calculations. Consider FIG. 1 in which router j is the destination and routers a, b, and c are neighbors of router i. Router b satisfies PFC and therefore is the feasible successor and the current successor of router i; router a is in the successor set $SS_j^i$ as it satisfies AFC. If link (i,b) fails, router a is set as the new successor, even though router c offers a shorter path. This is done because we know that only router a guarantees a loop-free path. However, because the path through a is not the shortest possible, router i becomes active.

As long as a router i finds a successor satisfying PFC after processing an input event, the router does not have to become active; otherwise, router i must start or forward a diffusing computation and become active, in which case it relies on neighbors satisfying AFC for packet forwarding. The rest of this section describes how diffusing computations are utilized in the ROAM protocol to create, maintain, and delete routes to destinations on demand.

C. Creating Routes

When a router gets a data packet for a destination for which it has no entry in its routing table, it starts a diffusing search, which is a diffusing computation originated by a source and propagated by each router that has no entry for the destination, because PFC is not satisfied at such routers. The source of this search can be either the source a of the data packet or any intermediate router on the path from the source to the destination. The diffusing search propagates from the source out on a hop-by-hop basis, until it reaches a router that has an entry for the requested destination, in which case the router replies with its distance to it. At the end of the search, the source either obtains a finite distance to the destination or all the nodes in the same connected component determine that the destination is unreachable ($D_j^i = \infty$ and node is passive).

A router starting the diffusing search adds the destination to its routing table ($D_j^i = FD_j^i = RD_j^i = \infty$, $s_j^i$=null, $o_j^i = 1$) and distance table ($D_{jk}^i = \infty \forall k \in N_i$), becomes active for the destination ($ST_{jk}^i$=active $\forall k \in N_i$) and sends a query to its neighbors. The queries used in a diffusing search report a distance $RD_j^i = \infty$.

A neighbor i that receives a query for j and has no entry for the destination adds the destination to its routing table ($D_j^i = FD_j^i = RD_j^i = \infty$, $s_j^i$=null, $o_j^i = 3$) and distance table ($D_{jk}^i = \infty \forall k \in N_i$), becomes active for the destination ($ST_{jk}^i$=active $\forall k \in N_i$) and forwards the query to its neighbors.

Replies to a query can result in making active routers passive and therefore shrinking the diffusing search and finally ending it. When a router gets a reply from neighbor k, it records the reported distance ($D_{jk}^i = RD_j^k$) and resets the active flag ($ST_{jk}^i$=passive).

Replies are sent by routers when any of the following three conditions are satisfied:

1. A router that already has an entry for the destination, infinite or finite, sends back a reply immediately with $RD_j^i = D_j^i$, because PFC is met by another neighbor. This condition also holds for the destination of the diffusing computation.

2. A router that is already active for the destination sends a reply back immediately with $RD_j^i = D_j^i$.

3. A router other than the source of the diffusing search that has received replies from all its neighbors sends a reply with $RD_j^i = D_j^i$. After a router i receives all replies, it sets $ST_{jk}^i$=passive for all $k \in N_i$ and sets its feasible distance, reported distance, and distance to the minimum value of $D^{ji} + l_k^i$ for all $k \in N_i$. The neighbor that offers the minimum value becomes the new successor and the feasible successor. If all the reply distance values received by a router are set to infinity, then the router sends a reply with $RD_j^i = \infty$ to the neighbor that sent it the query.

FIG. 2 illustrates a diffusing computation where router i is searching for a path to router j. For simplicity, unity link cost values are assumed in the computation. The first entry in the parenthesis is the distance to destination j and the second entry is the feasible distance to destination j. Routers k and j are the only routers which know of the existence of router j. Queries within the figure are denoted by arrows having solid lines, while the arrows with dashed lines are the replies, and the dotted arrows signify updates. Black circles indicate routers which are in an active state while white circles represent routers that are in a passive state. The source router gets a finite distance after a search, there can exist certain areas of the network that did not receive replies confirming the existence of the destination. Router m in the figure corresponds to such a router. These routers would assume that they are partitioned from the destination because they still have a distance of infinity to the destination. A mechanism is incorporated within the present invention to avoid this condition, which is referred to as threshold updates. These updates are sent by a router when its distance to a certain destination changes by more than a defined threshold. The parts of the network that have infinite entries for a destination that is not partitioned eventually change their distances to the correct distance. Routers that have no entry for the destination do not propagate updates.

D. Maintaining Routes

Link cost changes to a router k that is not the feasible successor just involve updating entries in the link cost table. When a link cost $l_{s_j^i}^i$, to the feasible successor $s_j^i$ decreases, router i just updates the distance and the feasible distance to reflect the new value $FD_j^i=D_j^i=D_{s_j^i}^i+l_{s_j^i}^i$. If $|D_j^i-RD_j^i|>\Delta D$ then $RD_j^i$ is set to the new value of $D_j^i$ and a threshold update is broadcast to all neighbors.

When a link cost to a feasible successor increases, router i checks to see if any neighbor in $SS_j^i$ still satisfies PFC. If PFC is not satisfied, then router i becomes active and starts a diffusing computation for destination j. Before sending out queries, the router checks if it can use as its successor for j, any neighbor in SSA that satisfies AFC. If a neighbor m satisfies AFC, then the distance, and the reported distance, are set to the distance through m. Therefore, the queries contain the distance through the neighbor that satisfies AFC, however, the feasible distance is not changed. If no neighbor satisfies AFC, then the reported distance, feasible distance, and distance is set to the new distance through the original successor, which comprises the successor that previously was the feasible successor.

Once router i starts a diffusing computation for destination j, it sets a flag $ST_{jk}^i$ to active and sends queries to all its neighbors. The flag $ST_{jk}^i$ ensures that routers in an active state for a certain destination will not forward any additional queries for that destination until all replies are received, which ensures that the queries are not forwarded forever and also helps to separate different diffusing computations. It will be appreciated that $ST_{jk}^i$ is active if router i has sent a query to router k for destination j but has not received a reply and passive otherwise. Therefore, if $ST_{jk}^i$ is set to active for any neighbor k, then router i does not forward any further queries. When an active router gets replies from all its neighbors, it resets its feasible distance $FD_j^i$ to infinity. It then picks the neighbor that satisfies PFC as the new feasible successor and becomes passive. It also sets its feasible distance, distance, and reported distance equal to the distance through the feasible successor. A router behaves differently if distance increases have occurred while it was in an active state.

The ROAM protocol assures that for any given destination, a router participates in only one diffusing computation at a time. However, there may exist more than one distance increase that requires processing while a router is in the active state. To track the multiple inputs that a router may have to process, the query origin flag $o_j^i$ is maintained by every router i for every destination j. This flag is set to one when a router is in the passive state ($ST_{jk}^i$=passive $\forall k \in N_i$). When a router is active ($ST_{jk}^i$=active for some $k \in N_i$) the value of $o_j^i$ can imply a number of conditions. It must be noted that a router may get queries from any neighbor, but it becomes active only when the feasible successor no longer satisfies PFC. The value for $o_j^i$ may comprise any of the following:

$o_j^i$=0: Router i is the origin of the query in progress and it has experienced at least one distance increase since becoming active.

$o_j^i$=1: Router i is the origin of the query in progress and it has experienced no distance increase and no query from successor since becoming active.

$o_j^i$=2: Router i became active due to a query from a successor and it experiences a distance increase, or it is the origin of a query and receives a query from the successor after becoming active.

$o_j^i$=3: Router i becomes active after receiving a query from a successor and experiences no distance increases after becoming active.

Figure 3:
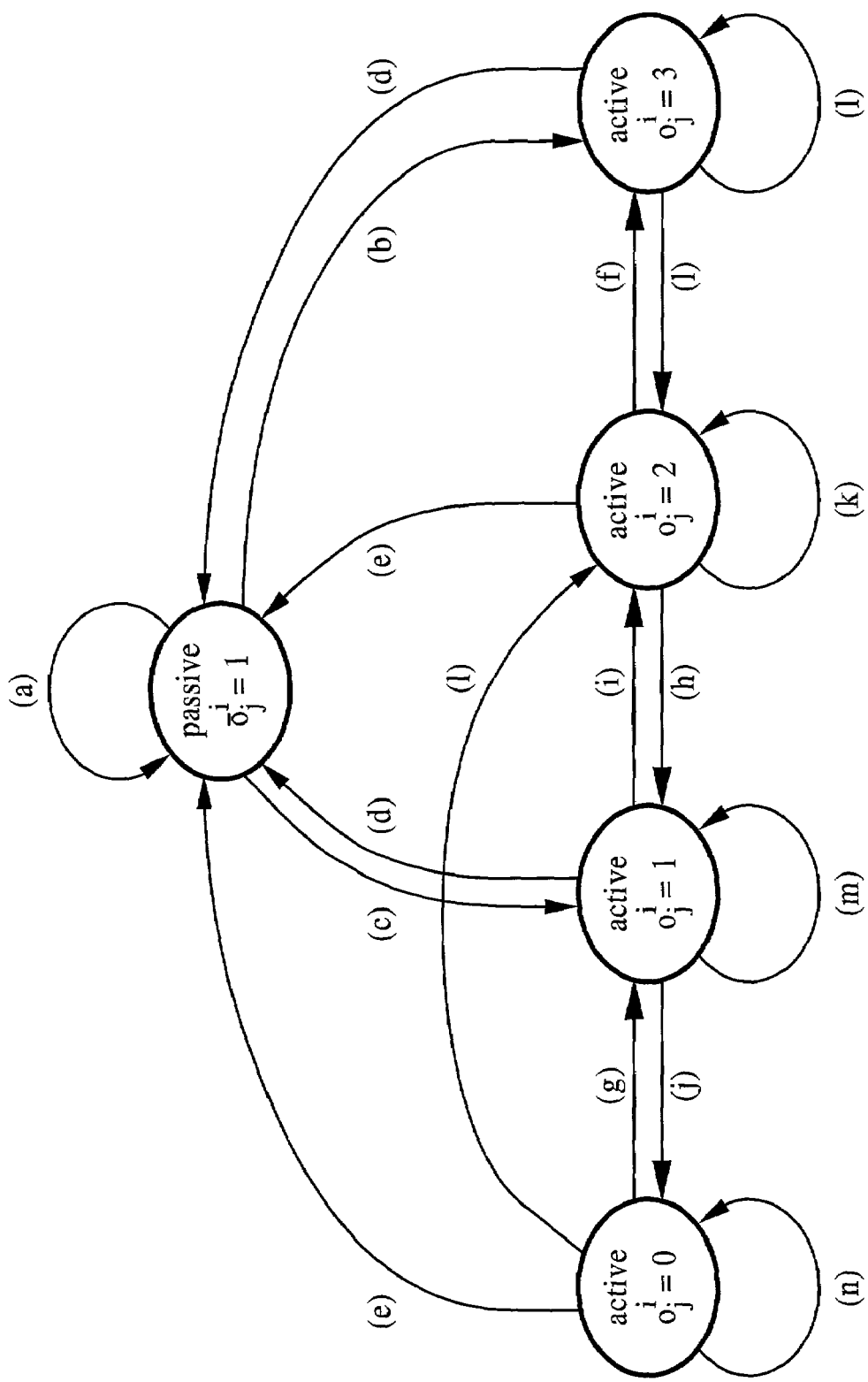
FIG. 3 is a state-diagram of active and passive states within the ROAM routing protocol according to an embodiment of the present invention, showing transitions between four active states and a single passive state.
Figure 4:
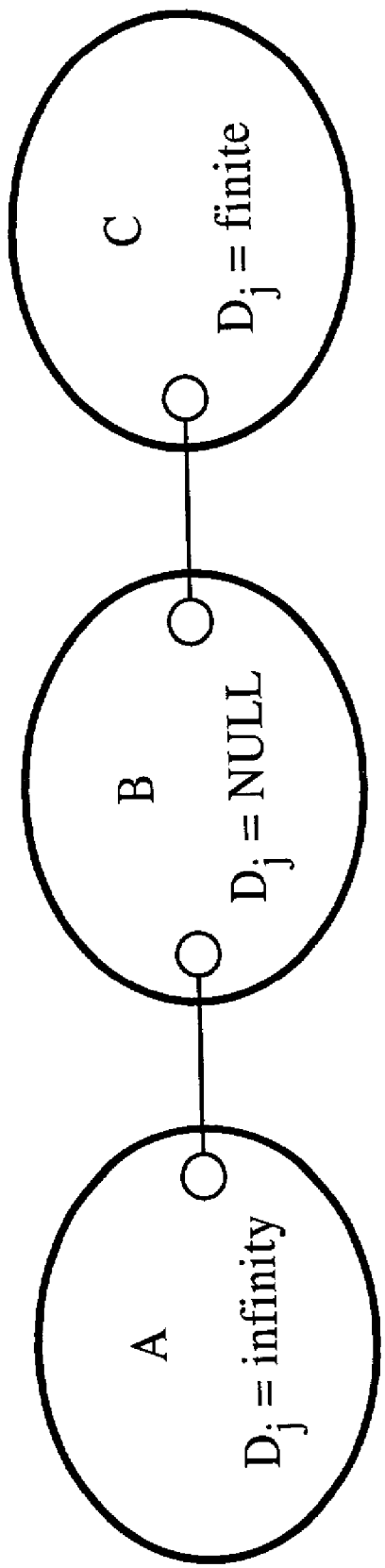
FIG. 4 is a network diagram of three networks joining according to an embodiment of the present invention.

When router i changes state from active to passive and $o_j^i$=1 or 3, router i resets the value of $FD_j^i$ to infinity. This results in a feasible successor being chosen by router i in the neighbor that offers the shortest path. If on the other hand $o_j^i$=0 or 2, router i retains its old $FD_j^i$ and checks for PFC. If PFC is not satisfied, another diffusing computation is started. Before starting the diffusing computation, the values of $o_j^i$ are changed from 0 to 1, and 2 to 3, respectively. Thus, we see that all distance increases are taken care of. A distinction is made between $o_j^i$=1 and 3 because in the case of $o_j^i$=3, a reply needs to be sent back to the old successor before the router becomes passive. A parallel distinction can be drawn between $o_j^i$=0 and 2. FIG. 3 shows the states in ROAM and the transitions between them. The figure does not consider link failures and link additions, which are discussed in the next section. The states within the ROAM protocol according to FIG. 3 are as follows:

(a) delete update, or input event related to neighbor k which is not a successor or PFC satisfied or $D_j^i=\infty$ and $D_{jk}^i=\infty$;

(b) query from successor and PFC and AFC not satisfied;

(c) input event other than query from successor;

(d) last reply; action: set $FD_j^i=\infty$;

(e) last reply and PFC satisfied with current value of $FD_j^i$;

(f) last reply and PFC and AFC not satisfied with current value of $FD_j^i$;

(g) last reply and PFC not satisfied with current value of $FD_j^i$;

(h) last reply, PFC not satisfied, but AFC satisfied;

(i) query from successor;

(j) increase in $D_j^i$;

(k) input event other than last reply;

(l) input event other than last reply or increase in $D_j^i$;

(m) input event other than last reply, increase in $D_j^i$ or query from successor;

(n) input event other than last reply of query from successor.

E. Handling Topology Changes

The topology of the network can change as a result of links going down or links coming up. When a new link comes up, it may result in partitioned sections of the network coalescing. Links going down may result in a network getting partitioned in addition to the destruction of routes. The failure of a router may be simply viewed as multiple links going down.

If router i detects a new neighbor k, it adds the neighbor to its routing table ($D_k^i=FD_k^i=RD_k^i=\infty$, $s_k^i=k$, $o_j^i=1$, $T_k^i$=present time), creates an entry for k in the distance table ($D_{jk}^i=\infty \forall j \in N$) and sends a full-state update to the new neighbor. The full-state update packet contains entries for all destinations contained in the routing table of the router. If router i is passive for a given destination, then the entry is marked as an update, otherwise it is marked as a query. An exception to the foregoing occurs for routing entries with distance values of infinity which are marked as queries. The reason for this exception, given that routes are set on demand, can be explained using FIG. 4.

Consider three networks A, B, and C joining. All the routers in A have the distance to destination j set to infinity. The routers in B have no entry for j and the routers in C have a finite entry for j. When the link connecting A and B comes up, if the entry for j is a simple update, then the router in B will ignore it. Therefore, even though there is a route to get to destination j which is in component C, routers in A will never be able to reach it because all of them have their distances set to infinity. Now, if the entry is a query, a diffusing search takes place in component B, at the end of which routers in A and B know the correct distance to destination j.

The full-state update can be split into multiple update packets if it does not fit into one. When a router i receives a full-state update packet from a neighbor k, it processes each entry one by one. If the entry is a query about destination j and the router does not already have an entry for that destination, then i adds the destination to its routing table ($D_j^i = FD_j^i = RD_j^i = \infty$, $s_j^i = k$, $o_j^i = 3$, $T_k^i =$ present time) and distance table ($D_{jm}^i = \infty \forall m \neq k$ and $D_{jk}^i = RD_j^k | m = k$), and becomes active for the destination ($ST_{jk}^i =$ active $\forall k \in N_i$) and forwards queries to its neighbors. If the query is for a destination that is in the router tables, the reported distance is stored $D_{jk}^i = RD_j^k$ and if PFC is not satisfied, router i becomes active ($ST_{jk}^i =$ active $\forall k \in N_i$, $o_j^i = 3$) and sends queries to all its neighbors. If PFC is satisfied, then router k remains passive and sends back a reply to router i containing its distance to j. If the entry is an update for a destination that i has no knowledge of, then i simply ignores the entry, otherwise it records the distance ($D_{jk}^i = RD_j^k$). If the distance through the neighbor is greater than the present distance ($D_{jk}^i + l_k^i > D_j^i$), nothing is done. If the distance through the neighbor is smaller than the present distance then router i sets router k as its new feasible successor ($D_j^i = D_{jk}^i + l_k^i$, $s_j^i = k$), If the change in distance is greater than a given threshold value, router i sends its neighbors the new distance within updates.

If a failure of link (i,k) is detected at router i, router i sets the value $D_{jk}^i$ to infinity for each destination j. If router i was active at the time of deletion of link (i,k), then setting $ST_{jk}^i$ to false and $D_{jk}^i$ to infinity mimics the behavior that would result from router i getting a reply with distance set to infinity from router k. If router i was passive and router k was the feasible successor, then router i would become active and commence a diffusing computation. If (i,k) was the only link connecting router the component of router i with the component of router k, then with the loss of link (i,k) router i loses its only successor. This results in router i sending a query with distance set to infinity. Since this query propagates to all routers which are components of router i, all of them eventually change their routing table entries to infinity, which signify partitioning from the destination component of router k.

Figure 5B:
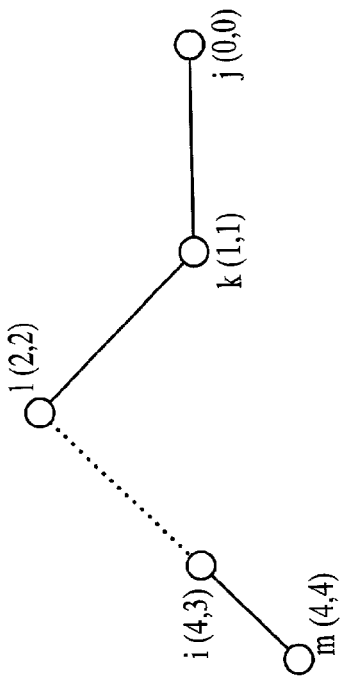
FIG. 5A through FIG. 5F is a topological map of traffic partitioning according to an embodiment of the present invention as a result of link failure.
Figure 5D:
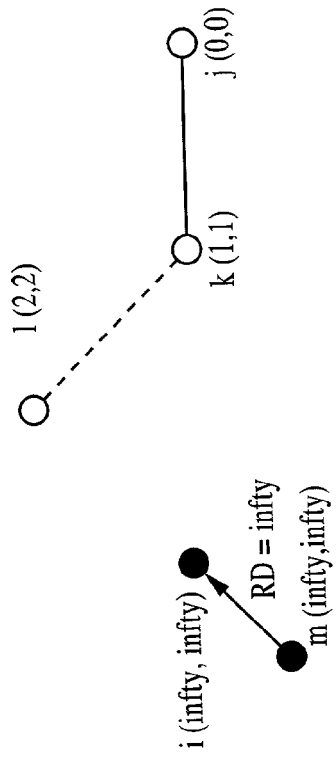
Figure 5A:
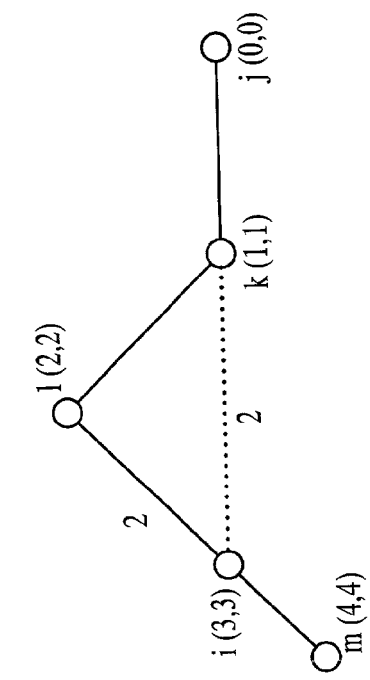
Figure 5C:
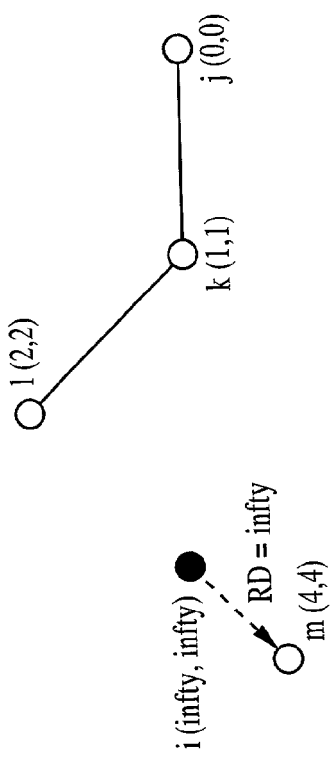
Figure 5E:
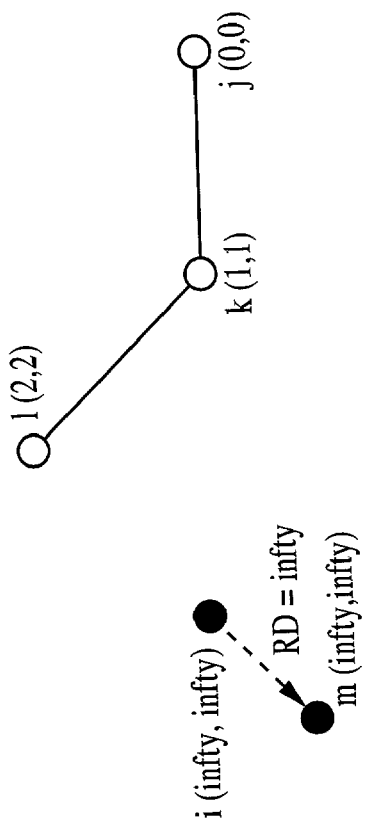
Figure 5F:
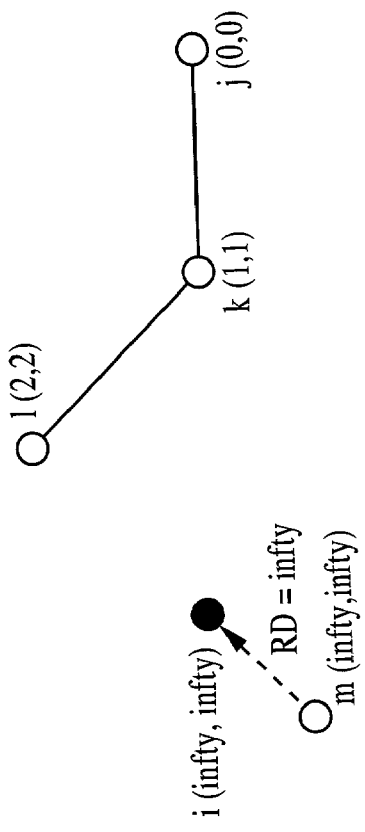
Figure 7:
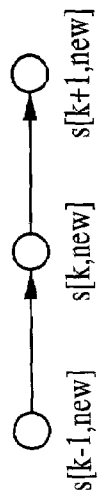
FIG. 7 is a topological map showing a path between three consecutive routers.

FIG. 5A through FIG. 5F exemplify a network in which links are subject to going down. The topology and notation of the example are equivalent to that of FIGS. 2A through 2F except that the two links (i,k) and (i,l) have link cost values equal to two. In FIG. 5A the link (i,k) fails where router k is the feasible successor of router i, whose feasible distance is three. Router i satisfies the feasibility condition since its distance of two, is less than three, and it now offers the shortest path to the destination. Therefore, router i remains passive and changes its distance, to a value of four. It should be noted, however, that the feasible distance does not change, because it is defined as the lowest distance value since the router became passive. In FIG. 5B, link (i,l) is depicted as failing, wherein router i thereby has no feasible successor. Therefore, router i becomes active, sets its distance, and feasible distance, to infinity and sends a query to router m. As shown in FIG. 5D, when router m receives the query, it becomes active due to having no feasible successor. When router m becomes active it sets its distance, and feasibility distance, to infinity, and also sends a query to router i. Router i in turn sends a reply with infinite distance because it is already active. Since router m has received replies from neighboring routers, it sets its feasible distance to infinity, becomes passive, and sends a reply to router i. Router i then in turn sets its feasible distance to infinity and becomes passive.

F. Deleting Routes

Routes are time stamped when they are entered into the routing table. They are also time stamped whenever data packets for the destination are seen. A timer-driven function compares the timestamp of the route to the current time at the router. If it exceeds the time threshold, the route is removed from the routing table. After removing a route from the routing table, the router sends delete updates with a negative reported distance to all its neighbors. When an active router receives a delete update from a neighbor, it simply ignores the update. When a passive router receives a delete update, it checks to determine if it has other successors besides the one to which the delete update was sent. If other successors exist, then the router does not change its routing tables, but removes from the distance table the earlier distance reported by the neighbor that sent the delete update. If other successors do not exist, then the destination entry is removed from the routing table and further delete updates are sent to all neighbors.

IV. ROAM Loop-Freedom

To prove that the ROAM protocol operates correctly, it must be proven that the protocol maintains loop-free paths to all destinations, does not reach a deadlock condition in any state, and that it converges to the correct distances. It will be appreciated that since the routes to different destinations are created and maintained independently of one another, that correctness of the protocol may be proven by proving correctness for any arbitrary destination router j.

The routers in N, their successors and the links from routers to their successors define a graph that we term $S_j(G)$. For the protocol to be loop-free, this graph has to be a directed acyclic graph at all times. The graph consisting of the routers upstream of router i that become active because of a query sent by router i, is called the active acyclic successor graph (ASG) of router i for destination j and is denoted by $S_{ji}(G)$. The loop-freedom proof of Theorem 1 is presented in Section IV-A. The theorem contains five lemmas. Lemma 1 proves that no router sends a reply when it becomes passive. Lemma 2 proves that ROAM is loop-free if successors are picked using PFC and AFC. Lemma 4 proves that ROAM is loop-free in the presence of a diffusing computation. Lemma 5 proves that ROAM executes multiple diffusing computations correctly. In addition, theorems and lemmas are included that prove liveness and safety for the sake of completeness.

Routers are initialized, at time t=0, and have no entries for any other destinations. The graph $S_j(G)$ consists only of all the routers in the graph with no links between them. This graph is trivially loop-free and has correct paths.

Assume that a loop $L_j(t)$ is formed for the first time at router t. For a loop to be formed, a router i must choose a router upstream from it in $S_j(G)$ as a successor. While $L_j(t)$ is formed because a router i changes its successor from router b to router α due to a change in its distance $D^i = D_{jb}^i + l_b^i$ at time t, wherein router b was the successor $s_j^i$ at time $t_b$ and $t_b < t$.

The router at the $k^{th}$ hop at time t is given by s[k,new], and s[k+1,new] is the successor of s[k,new] at time t. The time at which s[k,new] selects s[k+1,new] as its successor is denoted as $t_{s[k+1,new]}$ where $t_{s[k+1,new]}<t$. This is the last time a change was made in the routing table of s[k,new] for destination j, as is seen from the definition that:

$$s_j^{s[k,new]}(t_{s[k+1,new]}) = s_j^{s[k,new]}(t)$$

$$D_j^{s[k,new]}(t_{s[k+1,new]}) = D_j^{s[k,new]}(t)$$

The time at which the last update is sent by s[k,new] to its predecessor s[k−1,new] is denoted by $t_{s[k+1,old]}$, which is the last update that is sent before time t. The successor to router s[k,new] at time $t_{s[k+1,old]}$ is denoted by s[k+1,old] which may or may not be the same as s[k+1,new]. The times described above have the following relationship.

$$t_{s[k+1,old]} \leq t_{s[k+1,new]} \leq t$$

Figure 6:
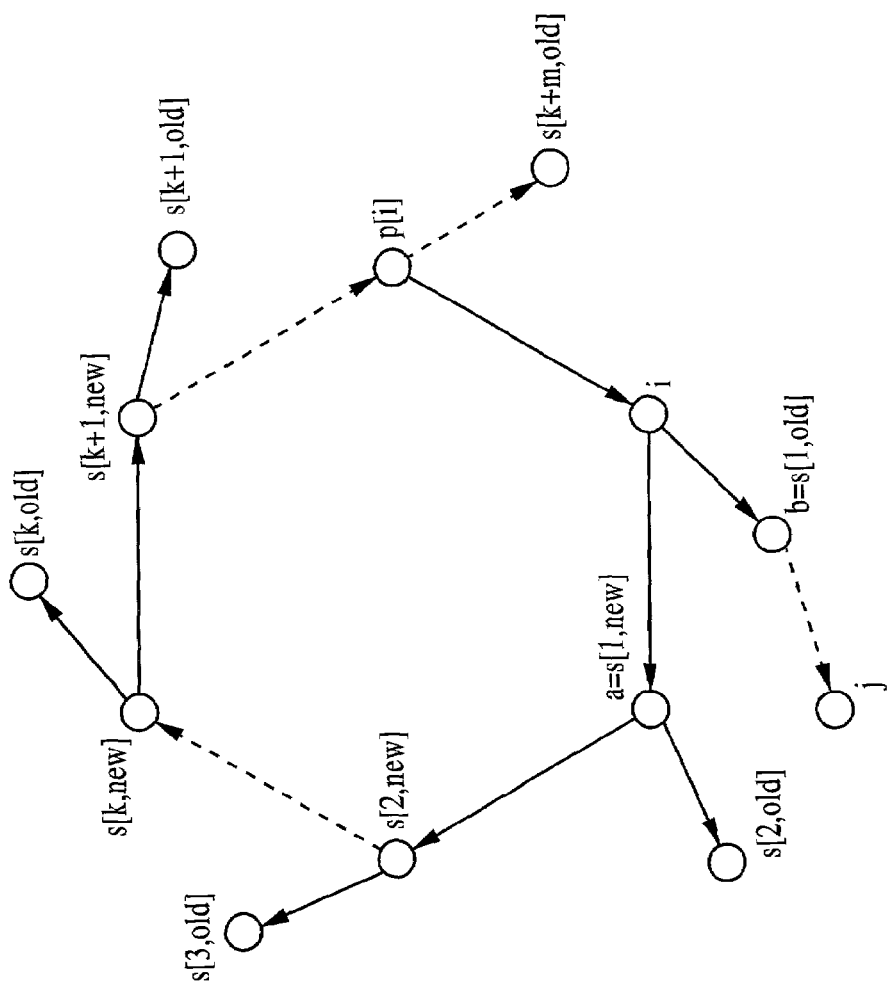
FIG. 6 is a topological map of a prospective traffic loop which may occur as a result of conventional routing, but that is prevented according to the ROAM routing protocol of the present invention.

A path $P_{ai}(t)$ consists of the sequence of routers:

$$\{a = s[1,new], s[2,new], \ldots, s[k,new], \ldots, i\}$$

as shown in FIG. 6. If a loop $L_j(t)$ exists, then $P_{ai}(t) \subset P_{aj}(t)$. Furthermore, it is also true that $s_j^{p[i]}(t)=i$, $s_j^i(t_b)=b$ and $t_b<t$. Wherein by definition, $D_j^{*i}(t_i) \leq D_j^i(t_i)$ at any time $t_i$ and $D_j^{*i}(t_1) \leq D_j^i(t_2)$ if $t_1 < t_2$.

Theorem 1: ROAM is loop free at all times.

Proof: The proof follows from Lemmas 1, 2, 3, 4 and 5.

Lemma 1: When a router becomes passive, it must send a reply to its successor if it is not the origin of the diffusing computation.

Proof: A router that receives a query from a neighbor other than the feasible successor remains passive and send a reply back immediately. When a router i is not the origin of a diffusing computation, it can become active only when it receives a query from its feasible successor and the feasible successor no longer satisfies PFC. If AFC is satisfied by a neighbor, then a reply is sent to the previous feasible successor and the router becomes the origin of the diffusing computation. Therefore, the given case need not be considered.

If AFC is not satisfied, then the router sets $o_j^i=3$ and sends queries to all its neighbors. If a router is already active when it receives a query from the current successor k, then i has to be the origin of the diffusing computation that caused it to be active in the first place. This is true because if router i was not the origin, then it would have to be true that router k sent a second query without receiving a reply. In accord with the specification, this cannot be true. A router i that receives a query when it is already active, sets $o_j^i=2$.

When router i receives all replies and $o_j^i=3$, the router sends a reply to the successor and sets $o_j^i=1$. When router i receives all replies and $o_j^i=2$, the router checks if any neighbor satisfies PFC. If there is a neighbor then router i sets $o_j^i=1$, and enters a passive state. If no such neighbor exists then router i sets $o_j^i=3$ and commences another diffusing computation wherein it enters the same state as a passive router taking part in the first diffusing computation. Therefore, if router i receives a query from a successor, then it sends a reply when it becomes passive.

Lemma 2: If there are no diffusing computations and routers select new successors for destination j, using PFC or AFC, then the resulting graph $S_j(G)$ is always loop free.

Proof: Assume that a loop $L_j(t)$ is formed for the first time at t. For a loop to be formed a router i must choose a router upstream from i in $S_j(G)$ as a successor.

A router picks a new successor only if it satisfies AFC or PFC. If either PFC or AFC have to be satisfied when a router s[k,new]$\in P_{aj}(t)$ makes router s[k+1,new]$\in P_{aj}(t)$ its successor at time $t_{s[k+1,new]}$ it must be true that:

$$D_{js[k+1,new]}^{s[k,new]}(t) = D_{js[k+1,new]}^{s[k,new]}(t_{s[k+1,new]}) < FD_j^{s[k,new]}(t_{s[k+1,new]})$$

Since all links costs are positive and either PFC or AFC must be satisfied by every router in $P_{ai}(t)$, we get the following inequalities while traversing it:

$$FD_j^i(t) = D_j^{*i}(t) > D_{ja}^i(t) = D_j^a(t_{s[2,old]})$$

$$D_j^a(t_{s[2,old]}) \geq D_j^{*a}(t_{s[2,old]}) \geq D_j^{*a}(t_{s[2,old]})$$

$$= FD_j^a(t_{s[2,new]}) > D_{js[2,new]}^a(t)$$

$$\vdots$$

$$D_{js[k,new]}^{s[k-1,new]}(t) = D_j^{s[k,new]}(t_{s[k+1,old]})$$

$$\geq D_j^{*s[k,new]}(t_{s[k+1,old]})$$

$$\geq D_j^{*s[k,new]}(t_{s[k+1,new]})$$

$$= FD_j^{s[k,new]}(t_{s[k+1,new]}) > D_{js[k+1,new]}^{s[k,new]}(t)$$

$$\vdots$$

$$D_{ji}^{p[i]}(t) = D_j^i(t_b) \geq D_j^{*i}(t) = FD_j^i(t)$$

The above set of inequalities leads to the erroneous conclusion that $FD_j^i(t) > FD_j^i(t)$. Therefore, it follows that no loop can be formed in $S_j(G)$ if the PFC and AFC are used while picking a new successor.

For Lemma 3 and Lemma 4, we assume that the successor graph $S_j(G)$ was loop-free before time t and consider the case where a single diffusing computation takes place in graph G.

Lemma 3: Consider a set of routers that form a path $P_{ai}(t)$. If router s[k,new] is passive at time t, it must be true that:

$$D_{js[k,new]}^{s[k-1,new]}(t) > D_{js[k+1,new]}^{s[k,new]}(t) \quad (1)$$

Proof: Consider the passive router s[k,new]$\in P_{aj}(t)$ that joined $P_{ai}(t)$ at some time earlier than t. This router is the successor of router s[k−1,new], and router s[k−1,new] is in turn its successor at time t.

Since there was a single diffusing computation, router s[k,new] must have become passive before time t. Router s[k,new] could have either kept its earlier feasible distance $FD_j^{s[k,new]}$ or reset it when it became passive. Consider the case where router s[k,new] did not reset its feasible distance. This case can be further divided into two sub-cases. In the first case, router s[k−1,new] does not receive an update containing the distance that s[k,new] has to destination j at time $t_{s[k+1,new]}$. Time $t_{s[k+1,old]}$ is the time s[k−1,new] received the last update from s[k,new]. This implies that:

$$D_{js[k,new]}^{s[k-1,new]}(t) = D_j^{s[k,new]}(t_{s[k+1,old]}) < FD_j^{s[k,new]}(t_{s[k+1,new]})$$

Because the feasible distance is the lower bound on the distance and it did not change, we get:

$$D_j^{s[k,new]}(t_{s[k+1,old]}) \geq FD_j^{s[k,new]}(t) > D_{j[k+1,new]}^{s[k,new]}(t)$$

From the above two equations, the lemma is true for sub-case one. Consider sub-case two, where router s[k−1, new] received an update containing the distance that s[k, new] has to destination j at time $t_{s[s+1,new]}$:

$$D_{j[k,new]}^{s[k-1,new]}(t) = D_j^{s[k,new]}(t_{s[k+1,new]})$$

Because the feasible distance is the lower bound on the distance and it did not change, it follows that:

$$D_j^{s[k,new]}(t_{s[k+1,new]}) = D_j^{s[k,new]}(t)$$

$$\geq FD_j^{s[k,new]}(t) > D_{js[k+1,new]}^{s[k,new]}(t)$$

Since the Lemma is true for this case, it implies that the Lemma is true for all cases where the feasible distance is not reset.

Consider the case where the feasible distance $FD_j^{s[k,new]}(t)$ is reset when router s[k,new] becomes passive. Router s[k,new] became active at time $t_k < t$ and became passive at time $t_{s[k+1,new]} < t$. Since there was only a single diffusing computation, there was no distance increase after router s[k,new] became active and therefore $o_j^i = 1$ or 3. At time $t_{s[k+1,new]}$, successor s[k+1,new] offers the shortest path. If AFC was not satisfied at $t_k$, s[k,new] kept its old successor while in the active state. Therefore for the case where AFC is not satisfied, or follows that:

$$D_j^{s[k,new]}(t) = D_j^{s[k,new]}(t_{s[k+1,new]}) \leq D_{js[k+1,old]}^{s[k,new]}(t_{s[k+1,new]}) =$$

$$l_{s[k+1,old]}^{s[k,new]}(t_{s[k+1,new]}) = D_j^{s[k,new]}(t_k)$$

If AFC is satisfied when s[k,new] becomes active, then s[k,new] changes its successor to a router we term as the intermediate successor s[k+1,int]. The intermediate successor s[k+1,int] is selected by router s[k,new] at time $t_k$, and it follows that:

$$D_j^{s[k,new]}(t) = D_j^{s[k,new]}(t_{s[k+1,new]}) \leq D_{js[k+1,int]}^{s[k,new]}(t_k) + l_{s[k+1,int]}^{s[k,new]}(t_k) \leq$$

$$D_{js[k+1,old]}^{s[k,new]}(t_k) + l_{s[k+1,old]}^{s[k,new]}(t_k) \leq D_j^{s[k,new]}(t_k)$$

From the above two equations, it will be appreciated that when the feasible distance is reset:

$$D_j^{s[k,new]}(t) \leq D_j^{s[k,new]}(t_k) \quad (2)$$

Router s[k,new] sends a query to all its neighbors at time $t_k$ and becomes passive only after it receives all replies at $t_{s[k+1,new]}$. Therefore, all neighbors are known to be aware of the distance from s[k,new] to the destination at time $t_k$. However, it may or may not be the case that router s[k−1, new] has processed an update sent by s[k,new] after time $t_{s[k+1,new]}$. If such an update has been processed, then it must be true that:

$$D_j^{s[k,new]}(t) = D_j^{s[k,new]}(t_{s[k+1,new]})$$

$$= D_j^{s[k,new]}(t_{s[k+1,new]}) > D_{js[k+1,new]}^{s[k,new]}(t)$$

If such an update has not been processed, then it is true that:

$$D_{js[k,new]}^{s[k-1,new]}(t) > D_j^{s[k,new]}(t_k)$$

It follows from Eq. 2 that for the case where the update is not processed:

$$D_{js[k,new]}^{s[k-1,new]}(t) > D_j^{s[k,new]}(t) > D_{js[k+1,new]}^{s[k,new]}(t)$$

Therefore, it is shown that this lemma is true for all cases.

Lemma 4: If only a single diffusing computation takes place in G, then $S_j(G)$ is loop free at every instant.

Proof: The proof is by contradiction. Assume that $S_j(G)$ is loop-free prior to time t and has a loop $L_j(t) \in S_j(G)$ for the first time at time t. This loop is created by a given input event that causes router i to change its successor and become the first router that generates a loop. Let router $b = s_j^i$ be the successor of i before time t. For router i to create a loop $L_j(t)$, it must change its successor to $s_j^i = a \neq b$.

There can be two reasons for changing the successor to router i. Either router i finds that router a satisfies AFC when router i becomes active or router i picks router a as its new successor upon entering the passive state.

Consider the case when AFC is satisfied and router i is in the active state. For router i to enter the active state, it must be true that router b no longer satisfies PFC at time t, which implies that either $D_{jb}^i$ or $l_b^i$ has increased. Consider the case wherein the change occurs in $D_{jb}^i$, it will be appreciated that since there is only a single diffusing computation and $S_j(G)$ is loop free until time t, the change that caused the increase of $D_{jb}^i$ cannot cause any router upstream of i in $P_{ap[i]}(t)$ to become active. If the increase was in $l_b^i$, then i starts the diffusing computation in $P_{ai}(t)$. In either case, at time t, when router i picks router a as its new successor, it is the only router active in $P_{ai}(t)$. Since $FD_j^i$ is not reset when i is active and AFC is satisfied, it is true that:

$$D_{ja}^i(t) < FD_j^i(t) \leq D_j^i(t)$$

Since all routers in $P_{ap[i]}(t)$ are passive, considering Lemma 3 that at time t it follows that:

$$D_{ja}^i(t) > D_{js[2,new]}^i(t) > D_{ji}^{p[i]}(t)$$

Wherein time t' was last time router i sent an update to router p[i]. Since the feasible distance has not been reset since then, it then follows that:

$$D_{ja}^i(t) = D_j^i(t') \geq FD_j^i(t') = FD_j^i(t)$$

It follows from the above three equations that $D_{ja}^i(t) > D_{ja}^i(t)$, which would be a contradiction. Therefore, router i cannot select a router upstream from it while it is in the active state.

Now consider the case in which router i is passive when it selects a neighbor a as a successor. For router i to have become active at an earlier time $t_i < t$, it has to be true that the successor b at that given time did not satisfy PFC, for example $D_{jb}^i(t_i)+l_b^i(t_i) \neq \text{Min}\{D_j^i(t_i)\}$ or $D_{jb}^i(t_i) \not\ll FD_j^i(t_i)$. This implies that either $D_{jb}^i$ or $l_b^i$ had increased from its previous value. Consider the case wherein the change occurs in $D_{jb}^i$. Since only a single diffusing computation occurs and $S_j(G)$ is loop free until time t, no router upstream of i can remain active. If the increase was in $l_b^i$, then i starts the diffusing computation in $P_{ai}(t)$. In either case, at time t, when router i becomes passive, it has to be true that all routers upstream of it in $P_{ai}(t)$ are passive. If FDA was not reset when i became active, it is then true that:

$$D_{ja}^i(t) < FD_j^i(t) \leq D_j^i(t)$$

Since all routers in $P_{ap[i]}(t)$ are passive, it follows from Lemma 3 that at time t:

$$D_{Ja}^i(t) > D_{js[2,new]}^a(t) > \ldots > D_{ji}^{p[i]}(t)$$

Time t' was the last time router i sent an update to router p [i]. If the feasible distance was not reset since then, it follows that:

$$D_{ji}^{p[i]}(t) = D_j^i(t') \geq FD_j^i(t') = FD_j^i(t)$$

It follows from the above three equations that $D_{ja}^i(t) > D_{ja}^i(t)$, which would be a contradiction.

If $FD_j^i$ was reset when router i became active at time $t_i$ it is still true that all the routers in $P_{ap[i]}$ are passive at time t. Therefore, it follows from Lemma 3 that:

$$D_{ja}^i(t) > D_{js[2,new]}^a(t) > \ldots > D_{ji}^{p[i]}(t)$$

When router i became active at time $t_i$, it sent out queries to all its neighbors including p[i]. Since there are no distance increases after i becomes active, it follows that:

$$D_{jb}^i(t) + l_b^i(t) = D_{jb}^i(t_i) + l_b^i(t_i) = D_j^i(t_i) = D_{ji}^{p[i]}(t)$$

It also follows from the above two equations that $D_{ja}^i(t) > D_{jb}^i(t) + l_b^i(t)$. However, for router i to select router a as its successor when i becomes passive, it has to be true that $D_{ja}^i(t) + l_a^i(t) < D_{jb}^i(t) + l_b^i(t)$, which again is a contradiction of our result. Therefore, router i cannot select a router upstream from it while being part of a diffusing computation and furthermore, in the presence of a single diffusing computation, $S_j(G)$ is loop-free at every instant.

Lemma 5: ROAM considers each computation individually and in the proper sequence.

Proof: Consider the case in which router i is the only router that can start diffusing computations. If router i generates a single diffusing computation, the proof is immediate from Lemma 4. If router i generates multiple diffusing computations, it is known that no router in $S_{ji}(G)$ can send a query before it receives all the replies to the query for which it was currently active. Therefore, because all routers in $S_{ji}(G)$ process each input event in FIFO order, and because each router that becomes passive must send an appropriate reply to its successor if it has any, according to Lemma 1, it follows that all the routers in $S_{ji}(G)$ must process each diffusing computation individually and in the proper sequence.

Consider now the case in which multiple sources of diffusing computations exist in G. Note that once a router sends a query, it must become passive before it can send another query. Hence, a router can be part of only one active ASG started by itself at any one given time. If a router is not the source of a diffusing computation, then it only becomes active when it receives a query from its feasible successor. Since a router can have only one feasible successor, it follows that a router can be part of only one ASG at a time. If all the ASG's have an empty intersection, they can be treated as a single diffusing computation. From the above, it will be appreciated that all diffusing computations are treated individually and in the proper sequence.

V. Complexity

The performance of ROAM can be measured in terms of the time and communication overhead required for routing tables to converge and the establishment of loop-free paths to the destinations. Actual time is difficult to predict since it involves predicting varying inter-router communication times and other delays associated with queuing, and so forth. Consequently, it is assumed that the protocols behave synchronously, which implies that all actions are taken by the routers in discrete steps. A router preferably receives its inputs, processes the inputs, changes its routing tables, and sends updates all in the same step, while the neighboring routers receive the updates in the following step. Performance evaluation begins with the measurement of the number of steps and messages which occur after a single topological change, such as a link failure, link addition, or a link cost change. The neighboring router subsequently discovers the topological change. During the final step, at least one router receives and processes updates from a neighbor, after which all routing tables are considered correct and no more updates need to be sent until the next topological change occurs. Time complexity is the measure of the number of steps required within this process and communication complexity is the measure of the number of messages required within the process.

According with the ROAM protocol, a router searches for a destination if the destination is not already in its routing tables. This involves sending a query, such as by broadcasting to all neighbors, wherein an infinite distance is given for each destination. Each neighbor receiving the query checks to determine if it has a routing table entry for the given destination. If it does not, then the neighbor becomes active and sends a query with infinite distance to all its neighbors which includes the one that sent it the original query. A router that is already active and receives a query does not send any more queries. Thus, it will be appreciated that a search query cannot be sent over a link more than twice. Therefore, the communication complexity is O(|E|), where |E| is the number of edges in the network. The time complexity is O(d) where d is the diameter of the network.

After a single link failure, or link-cost increase, the time complexity is the same as that given by the Jaffe-Moss algorithm. Under worst case conditions, all routers upstream of the destination must freeze their routing table entries for the destination. Therefore, the time complexity is given by O(x), where x is the number of routers affected by the routing table change. The communication complexity is O(6Dx), where D is the maximum degree of the router.

Any router that receives information reporting a distance decrease will always be able to find a feasible successor. Updates are only sent if the distance changes by a value greater than the given threshold. Therefore, link additions will at best have no reaction, and at worst have a message complexity of O(2Dx) with a time complexity of O(l), where l is the longest path to a destination.

To reduce bandwidth utilized for routing packets, ROAM protocol minimizes the number of update packets sent. Update packets can provide differing functionality as contrasted with query and reply packets, and are sent to inform neighbors of distance changes that do not affect loop-freedom. The number of updates being sent is minimized within ROAM by requiring that routers only send updates when the distance change is greater than a certain pre-specified threshold, such as given by $|D_{old}-D_{new}|>\Delta D$. A simple argument can illustrate the case where all routers are passive in the worst case for deviation from the optimum path, and the amount of deviation is equal to $\Sigma_{x=1}^{m} Min(\Delta D, \Delta D_j^{sx})$, where m is the number of intermediate routers and $\Delta D_j^{sx}$ is the difference between the best path through a neighbor that is part of the successor set, and the best path through a neighbor that is not in the successor set.

VI. Liveness and Safety

To prove liveness and safety, wherein ROAM converges to provide correct routing tables within a finite time, it is assumed that there is a finite time t after which no topology changes occur. It should be noted that the relevant topology changes are assumed to comprise link cost changes, link failures, and link additions. A router failure is modeled as multiple link failures. The only situation in which a router waits for an external event in order to complete its computation, is when a router is active and expects a reply from a neighbor in order to become passive. The next theorem and lemmas proves that the ROAM protocol is both live and safe.

Theorem 2: ROAM is live.

Proof: When a router is active and it receives a query, it immediately sends a reply to the query with its current distance to the destination. When a router is passive and it receives a query from a router, other than its feasible successor, it immediately sends a reply because the feasibility condition is satisfied. If the router is passive and it receives a query from its feasible successor, it forwards the query to all its neighbors and becomes active. In order to become passive again, a router needs to get replies from all its neighbors. Consider a router, such as router i, that freezes indefinitely as a result from not having received a reply from one of its upstream neighbors $k_1$. The router $k_1$, in turn, is frozen because one of its neighbors $k_2$ is frozen. One can follow the set of frozen routers until a leaf router is reached. Such a leaf router is known to exist, because the ASG is maintained loop-free at all times and G is finite and every upstream path in the directed acyclic successor graph has to start at leaf routers that have no parents. The leaf router must get replies from all its neighbors since it is not the successor of any of them. From Lemma 1 it is known that a leaf router must send a reply to its successor after it receives replies from its neighbors. Therefore, no router in the upstream path can remain active indefinitely.

From the above discussion we see that no router waits forever to get a reply from a neighbor and therefore ROAM is live.

Theorem 3: A finite time after time t, no new update messages are being transmitted or processed by routers in G, and all entries in all distance and routing tables are correct.

Proof: Assume that the transmission of update messages reporting topological changes never ceases, or terminates, and that there exist incorrect values in the routing tables. This implies that there must be at least one row, such as row j, within the routing tables for which either an infinite number of update messages are generated, or an incorrect distance or successor is obtained. After time t, either all routers are mutually reachable, or at least one is inaccessible from a subset of routers in the graph. Therefore, because ROAM treats each destination independently, it follows from Lemmas 6 to 10 that there cannot exist infinite updates, and therefore this theorem holds true.

Lemma 6: The change in the cost or status of a link is reflected in the distance and routing tables of an adjacent router within a finite time.

Proof: One of our assumptions is that a lower-level protocol gets information about the status of a link within a finite time. This protocol in turn calls a function of the routing protocol that makes a change in the distance table and routing table if necessary. Therefore, this lemma is true.

Lemma 7: The number of different values of the shortest distance to each destination in the routing table of each router in G is finite within the time interval (0,t).

Proof: There can only be a finite set of distinct link costs because there are a finite number of links and a finite number of link-cost changes in the time segment (0,t). Likewise, at time zero, the only destination distance values a router has is the distance to itself. Furthermore, G has a finite number of destinations.

The value of the shortest distance to a given destination stored at any router of G at time t' ($0 \leq t' \leq t$) can be equal only to the cost of the link to the destination, as given by Lemma 6, or to the sum of a finite distance value stored in the successor router chosen for the destination, plus the cost of the link to that successor router, or to infinity, in which case there is no successor router. Accordingly, there must be a finite number of distinct values that the shortest distance to a destination can assume at any given router within G in the time interval (0,t).

Lemma 8: Assume that at time t all routers in G are reachable from one another. Then, a finite time after t, no new updates are being transmitted or processed by any router, and the entries corresponding to each destination j in all topology and routing tables are correct.

Proof: Theorem 2 shows that no router can be active after a finite time $t_f \geq t$, and Lemma 7 shows that the set of values in the routing tables for the distances to destinations is finite within a finite time interval. The time t(k) is defined as the time required for a passive router, whose shortest path to the destination is k hops, to obtain the correct distance to the destination. The value D(k) is defined as the distance to the destination via the shortest path of k hops. This Lemma can be proven using induction on the number of hops k.

Consider the case for the number of hop being zero, k=0. This case is trivially true because a router never becomes active for itself and always has a correct distance to itself. In the case of k=1, all routers are considered whose shortest path is one hop. These routers must be the immediate neighbors of the destination router. Lemma 6 proves that these routers know the correct link cost to the destination in a finite time. Therefore, at some time $t_1 > t_f$ all D(1) values are changed to their correct values and no new updates are sent with D(1) values. From the inductive hypothesis, all D(k) are correct within a finite time $t_k$ and no new updates are sent with values D(k). Consider a router i whose shortest path contains k+1 hops. The path of k+1 hops can be divided into a path of k hops from the destination to a neighbor m of i and the last link from m to i. It is known that m has a shortest path of k hops, or else i would not have a shortest path of k+1 hops. From the inductive hypothesis, it is known that there exists a time $t_k > t_f$ within which m has its shortest distance and sends updates to all neighbors including router i. Therefore within a finite time given by $t_{k+1} > t_k$, router i receives the update, processes it, marks the shortest distance to the destination j, and sends updates with the new distance. Since there is no change in the shortest distance value D(k) of i after $t_{k+1}$ there are no additional updates sent after time $t_{k+1}$. Therefore, it will be appreciated that within a finite time all routers that have a finite number of hops in the shortest path also will have obtained the correct shortest distance values. Since all routers are connected and the ROAM protocol is known to be loop-free, using Lemma 7 it is also known that the routers have finite and correct routing table values, therefore this Lemma is also shown to be true.

Lemma 9: If at time t, a destination router j is unreachable from all routers in a component $C \subset N$, then no router in C can terminate with a non-infinite distance to j.

Proof: Consider a passive router i in component C that has a $D_j^i < \infty$. If i becomes passive with a non-infinite distance to j, it must be true that one of its neighbors became passive with a non-infinite distance to j. As a result of ROAM being loop-free and live, a trace of the downstream path cannot end at router j. The path must finally end at a router m that has no successor for j, but that has a finite distance to router j. This is impossible from the specification of the protocol. Therefore, we prove by contradiction that all routers that are partitioned from a given destination have an infinite distance for that destination when they terminate.

Lemma 10: Assume that at time t, at least one router $j \in G$ is inaccessible to a subset of routers in graph G. Then, a finite time after t, no new update messages with an entry for router j are being transmitted or processed by routers, and the entries corresponding to router j in all topology and routing tables are correct.

Proof: After time t, G must consist of one or more connected components and a set of zero or more isolated routers. Because an isolated router sets all its routing-table entries to infinity, and doesn't send any updates after detecting a lack of neighbors, the proof needs only to consider the connected components. Without loss of generality, consider a connected component C that is disconnected from destination router j. From the discussion in Lemma 9, it is known that there must exist one or more routers in C that have no successors for router j. This set of routers is defined as D. Also from the discussion in Lemma 9, it is known that from every router in C a downstream path can be traced to one of the routers in D.

Since each router in D detects that it has no successor, it becomes active and sends a query out with distance set to infinity. From Theorem 2 we know that within a finite time after t all routers in D that started a diffusing computation have to become passive. For routers in D to become passive, all routers upstream need to enter the passive state. The routers upstream of routers in D includes all routers in C.

Accordingly, it will be seen that this invention provides an on-demand routing protocol utilizing multiple loop-free paths without the necessity for maintaining complete path information, periodically refreshed sequence numbers, or the use of time stamps. The analysis of the ROAM protocol has theoretically shown that the protocol is loop-free and that it converges within a finite time. A solution to the search-to-infinity problem has been described for inclusion within ROAM, such that sources do not send repeated flood searches in the event of destinations being unreachable. In addition, time and communication complexity results for ROAM were considered which are particular applicable to wired networks, wireless networks with static nodes, while they could also be applied to wireless networks with some degree of mobility. It should be appreciated that the algorithm has been exemplified with specific structures, rules, and algorithms that may be altered by one of ordinary skill in the art without departing from the teachings of the present invention.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for on-demand routing of data packets in a wired or wireless data network, comprising:
   creating a routing table entry in a router from a source to a destination when said router receives a data packet for said destination; and
   maintaining said routing table entry until said router no longer receives data traffic from said source;
   wherein the step of maintaining said routing table entry comprises:
      time stamping a route when said route is entered into said routing table and when a data packet for the destination is received by said router:
      comparing the timestamp of a route to current time at the router: and
      removing said route from the routing table if the difference between said time stamps exceeds a threshold.

2. A method as recited in claim 1, wherein said step of creating a routing table entry comprises:
   starting a diffusing search if said router receives a data packet for routing to a destination for which it has no routing table entry.

3. A method as recited in claim 2, wherein said diffusing search propagates out on said network from said source on a hop-by-hop basis until it reaches a router that has a routing table entry for said destination.

4. A method as recited in claim 3, wherein a router that has a routing table entry for said destination replies with distance from said source to said router.

5. A method as recited in claim 4, wherein at the end of said diffusing search, said source either obtains a finite distance to said destination or all neighboring nodes determine that said destination is unreachable.

6. A method as recited in claim 2:
   wherein said router has a routing table and a distance table; and
   wherein at the start of said diffusing search said router adds the destination to its routing table and distance table, becomes active for the destination, and sends a query to a neighboring router.

7. A method as recited in claim 6, wherein said neighboring router reports a distance in response to said query.

8. A method as recited in claim 7:
wherein a neighboring router has a routing table and a distance table; and
wherein a neighboring router that receives a query for a destination but has no routing table entry for the destination adds the destination to its routing table and distance table, becomes active for the destination, and forwards the query to a neighboring router.

9. A method as recited in claim 8, wherein a reply to a query can make an active router passive.

10. A method as recited in claim 1, wherein said step of maintaining said routing table entry further comprises sending a delete update with a negative reported distance to a neighboring router.

11. A method as recited in claim 10, wherein an active router ignores a delete update from a neighboring router.

12. A method as recited in claim 10, wherein when a passive router receives a delete update, said passive router checks to determine if it has a successor other than the successor to which the delete update was sent;
if a successor exists, then said passive router does not change its routing table entries, but removes from the distance table the earlier distance reported by the neighboring router that sent the delete update; and
if a successor does not exist, then the destination entry is removed from the routing table of said passive router and said a passive router sends a delete update to a neighboring router.

13. A method for on-demand routing of data packets in a wired or wireless data network, comprising:
creating a routing table entry in a router from a source to a destination when said router receives a data packet for said destination;
maintaining said routing table entry until said router no longer receives data traffic from said source; and
deleting said routing table entry if said router no longer receives data traffic from said source;
wherein said step of deleting said routing table entry comprises:
time stamping a route when said route is entered into said routing table and
when a data packet for the destination is received by said router;
comparing the timestamp of a route to current time at the router; and
removing said route from the routing table if the difference between said time stamps exceeds a threshold.

14. A method as recited in claim 13, wherein said step of maintaining said routing table entry further comprises sending a delete update with a negative reported distance to a neighboring router.

15. A method as recited in claim 14, wherein an active router ignores a delete update from a neighboring router.

16. A method as recited in claim 14, wherein when a passive router receives a delete update, said passive router checks to determine if it has a successor other than the successor to which the delete update was sent;
if a successor exists, then said passive router does not change its routing table entries, but removes from the distance table the earlier distance reported by the neighboring router that sent the delete update; and
if a successor does not exist, then the destination entry is removed from the routing table of said passive router and said a passive router sends a delete update to a neighboring router.

17. A method for on-demand routing of data packets in a wired or wireless data network, comprising:
creating a routing table entry in a router from a source to a destination when said router receive a data packet for said destination;
time stamping a route when said route is entered into said routing table and
when a data packet for the destination is received by said router;
comparing the timestamp of a route to current time at the router; and
deleting said route from said routing table if the difference between said time stamps exceeds a threshold.

18. A method as recited in claim 17, wherein said step of creating a routing table entry comprises:
starting a diffusing search if said router receives a data packet for routing to a destination for which it has no routing table entry.

19. A method as recited in claim 18, wherein said diffusing search propagates out on said network from said source on a hop-by-hop basis until it reaches a router that has a routing table entry for said destination.

20. A method as recited in claim 19, wherein a router that has a routing table entry for said destination replies with distance from said source to said router.

21. A method as recited in claim 20, wherein at the end of said diffusing search, said source either obtains a finite distance to said destination or all neighboring nodes determine that said destination is unreachable.

22. A method as recited in claim 18:
wherein said router has a routing table and a distance table; and
wherein at the start of said diffusing search said router adds the destination to its routing table and distance table, becomes active for the destination, and sends a query to a neighboring router.

23. A method as recited in claim 22, wherein said neighboring router reports a distance in response to said query.

24. A method as recited in claim 23:
wherein a neighboring router has a routing table and a distance table; and
wherein a neighboring router that receives a query for a destination but has no routing table entry for the destination adds the destination to its routing table and distance table, becomes active for the destination, and forwards the query to a neighboring router.

25. A method as recited in claim 24, wherein a reply to a query can make an active router passive.

26. A method as recited in claim 17, further comprising sending a delete update with a negative reported distance to a neighboring router.

27. A method as recited in claim 26, wherein an active router ignores a delete update from a neighboring router.

28. A method as recited in claim 26, wherein when a passive router receives a delete update, said passive router checks to determine if it has a successor other than the successor to which the delete update was sent;
if a successor exists, then said passive router does not change its routing table entries, but removes from the distance table the earlier distance reported by the neighboring router that sent the delete update; and if a successor does not exist, then the destination entry is removed from the routing table of said passive router and said a passive router sends a delete update to a neighboring router.

29. A method for on-demand routing of data packets in a wired or wireless data network, comprising:
   starting a diffusing search if a router receives a data packet for routing to a destination for which it has no routing table entry;
   creating a routing table entry said router based on said diffusing search;
   time stamping a route when said route is entered into said routing table and when a data packet for the destination is received by said router;
   comparing the timestamp of a route to current time at the router; and
   deleting said route from said routing table if the difference between said time stamps exceeds a threshold.

30. A method as recited in claim 29, wherein said diffusing search propagates out on said network from said source on a hop-by-hop basis until it reaches a router that has a routing table entry for said destination.

31. A method as recited in claim 30, wherein a router that has a routing table entry for said destination replies with distance from said source to said router.

32. A method as recited in claim 31, wherein at the end of said diffusing search, said source either obtains a finite distance to said destination or all neighboring nodes determine that said destination is unreachable.

33. A method as recited in claim 29:
   wherein said router has a routing table and a distance table; and
   wherein at the start of said diffusing search said router adds the destination to its routing table and distance table, becomes active for the destination, and sends a query to a neighboring router.

34. A method as recited in claim 33, wherein said neighboring router reports a distance in response to said query.

35. A method as recited in claim 34:
   wherein a neighboring router has a routing table and a distance table; and
   wherein a neighboring router that receives a query for a destination but has no routing table entry for the destination adds the destination to its routing table and distance table, becomes active for the destination, and forwards the query to a neighboring router.

36. A method as recited in claim 35, wherein a reply to a query can make an active router passive.

37. A method as recited in claim 29, further comprising sending a delete update with a negative reported distance to a neighboring router.

38. A method as recited in claim 37, wherein an active router ignores a delete update from a neighboring router.

39. A method as recited in claim 37, wherein when a passive router receives a delete update, said passive router checks to determine if it has a successor other than the successor to which the delete update was sent;
   if a successor exists, then said passive router does not change its routing table entries, but removes from the distance table the earlier distance reported by the neighboring router that sent the delete update; and
   if a successor does not exist, then the destination entry is removed from the routing table of said passive router and said a passive router sends a delete update to a neighboring router.

* * * * *